Oct. 18, 1932.  J. BOYER  1,883,514

THERMOSTATIC DASHPOT

Filed June 29, 1931

Inventor:
Joseph Boyer, Dec.
By Detroit Trust Co; H. L. Candler and S. Backus, Executors Rector, Hibben, Davis, & Macauley
ATTORNEYS Patented Oct. 18, 1932

1,883,514

UNITED STATES PATENT OFFICE

JOSEPH BOYER, DECEASED, LATE OF DETROIT, MICHIGAN, BY DETROIT TRUST COMPANY, OF DETROIT, MICHIGAN, HENRY E. CANDLER, OF DETROIT, MICHIGAN, AND STANDISH BACKUS, OF DETROIT, MICHIGAN, EXECUTORS, ASSIGNORS TO BURROUGHS ADDING MACHINE COMPANY, OF DETROIT, MICHIGAN, A CORPORATION OF MICHIGAN

THERMOSTATIC DASHPOT

Application filed June 29, 1931. Serial No. 547,728.

This invention relates to a dash pot that is particularly useful with calculating machines and the like.

Dash pots are used with calculating machines in order to govern the speed of operation of the machines. This speed must be approximately constant under all conditions because the machines are designed to operate at a given speed and will often not operate satisfactorily at substantially different speeds.

If a dash pot is built to control a machine at a given speed when the dash pot and the oil in it are cold, the machine will run too fast when the oil becomes warm, which it does due to friction, agitation of the oil, and other causes. It has been found in practice that the average oil dash pot will permit an increase in machine speed of twenty or more strokes per minute from the time the machine is started with the oil in the dash pot at the normal indoor temperature of 70 degrees Fahrenheit to the time that operation of the machine has fully warmed up the oil to a temperature of substantially 170 degrees Fahrenheit. This is too great a variation in speed and often causes difficulty. The present invention has been designed to solve this problem.

The general object of the invention is to provide an improved dash pot construction, particularly one that is responsive to the temperature of the oil in the dash pot.

A more particular object is to provide a dash pot with a thermostatic control that will automatically act to maintain the retarding action of the dash pot substantially constant under varying conditions of temperature.

Other objects and advantages of the invention will appear from the specification and drawing.

An embodiment of the invention is shown in the acompanying drawing in which.

The dash pot includes a fluid cylinder 10 normally closed by a screw cap top 11. Extending through this top is a piston rod 13 having a piston 14 on its lower end.

Figure 1:
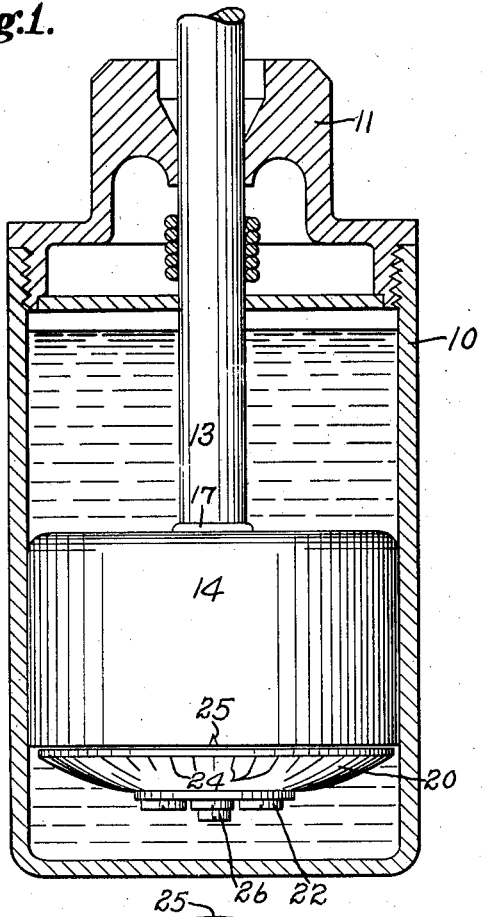
Figure 1 is a side elevation of the improved dash pot with the cylinder shown in dot and dash lines so as to illustrate the piston more clearly.
Figure 2:
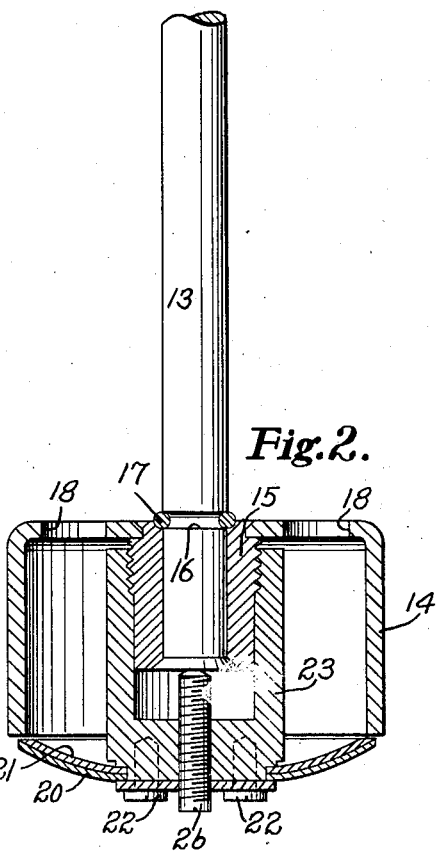
Fig. 2 is a sectional elevation of the piston shown in Fig. 1.

The piston 14 is cup-shaped in the embodiment of the invention illustrated, but may, of course, be of any other suitable shape. The piston is preferably attached to the piston rod by being fixed to a bushing 15 (Fig. 2) by riveting and this bushing is, in turn, fixed to the lower end of the piston rod 13. The bushing is preferably attached to the piston rod by providing an annular groove 16 in the piston rod in which is positioned a ring 17. The bushing is then put on the end of the piston rod and the lower end of the rod riveted as shown in Fig. 2.

Fluid, such as oil, may flow from one side of the piston to the other through the interior of the cup-shaped piston and through openings 18 in the piston top. It will be understood, of course, that these openings or passages could be located in various other portions of a piston of this character or through the piston rod itself or in the sides of the cylinder and, in the application of the thermostatic valve hereinafter described, it will be understood that the invention contemplates control of these fluid passages no matter where they may be located.

Figure 3:
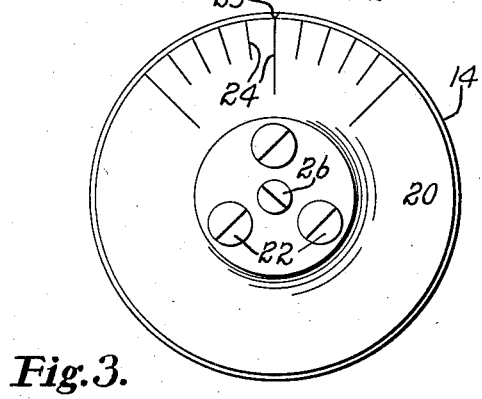
Fig. 3 is a bottom view of the piston shown in Fig. 2.
Figure 4:
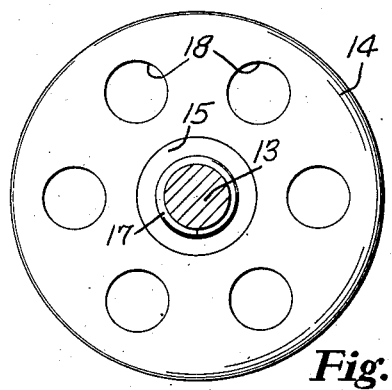
Fig. 4 is a top view of the piston shown in Fig. 2.

The thermostatic valve preferably comprises two metal disks or plates 20 and 21 having different co-efficients of expansion. The lower or outside disk 20 is made of brass or bronze having a relatively high co-efficient of expansion while the inner or upper disk 21 is made of nickel steel or a similar material having a relatively low co-efficient of expansion. These two disks are fused or otherwise tightly fixed together and they are attached by screws 22 to the lower end of a hollow bushing 23 that is screw threaded onto the bushing 15. The edges of the disks 20 and 21 are positioned closely adjacent the lower edge of the piston 14 so that the fluid, in passing from one side of the piston to the other, passes between the edges of the disks and the lower edge of the piston. It will be readily apparent that by adjusting the bushing 23 the initial space between the edges of the disks and the piston may be varied to suit the requirements. A suitably graduated scale 24, shown in Fig. 3, is provided on the lower disk cooperating with a mark 25 on the piston so that the adjustment of the disks may be readily gauged. A set screw 26 (Fig. 2) is provided for locking the bushing 23 in place after the disks have been adjusted.

In operation, the dash pot starts with the edges of the thermostatic valve at a predetermined distance from the bottom edge of the piston, which distance may be regulated as above described. As the machine is operated and the oil in the dash pot becomes warmer, and consequently thinner, the heat expands the disks 20 and 21. Inasmuch as the outer disk 20 expands at a higher rate than the inner disk, the tendency will be for the edges of the valve to approach the piston, with the result that the space through which the oil must flow is made smaller. This takes place while the oil is becoming thinner with the result that the retarding action of the dash pot remains substantially constant. Of course, when the oil cools again, the disks move back toward their original position, the entire action being automatic. It is to be understood that the same action would take place if the fluid in the cylinder were heated or cooled by changes in temperature due to other causes than the friction of operation.

In this manner the action of the dash pot is automatically maintained constant, no matter what the temperature of the dash pot may be due to the heating action of operation of the dash pot or to temperature changes in the room or to any other circumstance that may change the temperature of the dash pot fluid.

It is to be understood that the structure shown is for purposes of illustration only and that variations may be made in it without departing from the spirit and scope of the invention as defined by the appended claims.

What is claimed is:

1. A dash pot for calculating machines comprising a fluid cylinder, a cup-shaped piston in said cylinder having an open lower end, and a pair of metal disks supported by said piston with their edges adjacent the lower edges of said cup, said metal disks having different coefficients of expansion whereby the edges of said disks are spaced from the bottom of said piston in accordance with the temperature of the fluid in said dash pot.

2. A dash pot for calculating machines having a closed fluid cylinder, a piston rod extending through one end of said cylinder, a cup-shaped piston on said piston rod, the open end of said piston being downward, an adjustable sleeve carried by said piston rod, a pair of metal disks on said sleeve having their edges positioned adjacent the lower edge of said cup-shaped piston, said metal disks having different coefficients of expansion whereby the space between the edges of said disks and said piston is automatically varied in response to the temperature of the fluid in said dash pot.

In witness whereof, we have signed our names this 18th and 19th day of June, 1931.

DETROIT TRUST COMPANY,
*Successor to Detroit & Security Trust Company,*
By CHAS. P. SPICER,
*Vice President,*
J. J. SPOUTZ,
*Assistant Secretary,*
STANDISH BACKUS,
HENRY E. CANDLER,
*Executors under Will of Joseph Boyer, Deceased.*